United States Patent [19]

Parker

[11] Patent Number: 4,716,204

[45] Date of Patent: Dec. 29, 1987

[54] USE, AS LATENT CROSS-LINKERS FOR EPOXY RESINS, OF COMPOUNDS WHICH CAN BE REARRANGED IN SITU TO DIFUNCTIONAL PHENOLS

[75] Inventor: Theodore L. Parker, Lafayette, Calif.

[73] Assignee: The Dow Chemical Company, Midland, Mich.

[21] Appl. No.: 914,849

[22] Filed: Oct. 3, 1986

Related U.S. Application Data

[62] Division of Ser. No. 763,866, Aug. 9, 1985, Pat. No. 4,631,331.

[51] Int. Cl.$^4$ .................. C08G 59/14; C08G 59/62; C07D 263/38
[52] U.S. Cl. .................................. 525/504; 525/523; 528/96; 548/232
[58] Field of Search ............... 548/232, 311; 525/504, 525/523; 528/96

[56] References Cited

U.S. PATENT DOCUMENTS

| | | | |
|---|---|---|---|
| 3,415,901 | 12/1968 | Schramm et al. | 528/96 X |
| 3,676,397 | 7/1972 | Clarke | 528/106 X |
| 3,687,897 | 8/1972 | Clarke | 528/51 |
| 3,789,053 | 1/1974 | Clarke | 528/96 |
| 4,341,693 | 7/1982 | Buxbaum | 528/96 X |
| 4,380,781 | 9/1982 | Rasshofer et al. | 528/117 X |

*Primary Examiner*—Earl Nielsen

[57] ABSTRACT

2-(3H)-benzoxazolone and certain other benzo-N-heterocycles, as such or as their adduction products with epoxides, may be employed as organo-soluble, latent phenolic curing agents for epoxy resins. The phenolic hydroxyls are provided by rearrangement of the adduction products. Excellent shelf lives, pot lives, gel times and physical properties result.

27 Claims, No Drawings

USE, AS LATENT CROSS-LINKERS FOR EPOXY RESINS, OF COMPOUNDS WHICH CAN BE REARRANGED IN SITU TO DIFUNCTIONAL PHENOLS

This is a divisional of application Ser. No. 763,866, filed Aug. 9, 1985, U.S. Pat. No. 4,631,331, Dec. 23, 1986.

BACKGROUND OF THE INVENTION

Preformable, homogeneous epoxy resin compositions which are not self-reactive at ordinary or "prepreg" process temperatures, but which become self-curing when more strongly heated, are known.

However, none of the three prior art systems of the preceding type known to the present inventor provide organo-soluble curing agents in which the latent reactive function is a phenolic hydroxyl group. Rather, NH, NCO or metal salt complexes with imidazoles are provided. It will be seen from the following summary descriptions that at least two of the known systems also have other shortcomings as latent epoxy curing agents.

U.S. Pat. No. 4,111,917 discloses the use of certain, thermally decomposable epoxy-miscible urethanes as latent amines. The urethanes are formed by reacting isocyanates with alcohols which tend to be readily dehydrated to olefins. When heated to epoxy curing temperatures, these urethanes decompose to form primary amines, $CO_2$ and the dehydrated alcohol. One end of the urethane molecule may be attached to an epoxy resin by a thermally stable urethane group derived from a secondary alcoholic hydroxyl in the epoxy but the other end must terminate in a urethane group which does decompose as above described. Thus, the utility of the patented system is limited to thin film applications, in which degassing is practical.

U.S. Pat. No. 4,448,816 discloses the use of cyclic ureas, in which one of the nitrogen-attached hydrogens is replaced with a $-CO-C_nH_{2n}-NCO$ group, as "one-can", latent isocyanate curing agents. The isocyanate group is reacted with an active hydrogen in a polyol or polymer to form a stable adduct group and—upon heating—each cyclic urea moiety in the adduct rearranges to a linear $OCN-C_nH_{2n}-NH-$ group. The hydrogens in the resulting $-NHCO-$ moieties are presumably oxirane reactive but the patented system would appear to be impractical as a latent curing agent in one part epoxy compositions.

U.S. Pat. No. 4,487,914 discloses the use, as latent curing agents, of epoxy-miscible complexes of metal salts with 2:1 or 1:1 adducts of monoepoxides (such as phenyl glycidyl ether) with imidazoles. To the best of the present inventor's knowledge, no oxirane-reactive compounds which contain masked phenolic hydroxyls and will form organo-soluble complexes with metal salts have been disclosed.

OBJECTS OF THE INVENTION

The principal object of the present invention is to provide a homogeneous, one-part epoxy resin composition which has a long shelf life at ordinary temperatures, has a relatively long pot life, and comprises a latent phenolic as the curing agent.

An important object is to provide as the latent curing agent a 2:1 adduct of a monofunctional $=NH$ compound with a liquid diepoxide.

Another object is to utilize as the curing agent one which can be formed—in situ or separately—by an adduction reaction (which produces no by-products).

A further object is to utilize as the curing agent one which generates the phenolic hydroxyls by rearrangement and does not co-generate any residual or by-products which must be neutralized or removed or are not included in the cross-links formed when the composition is cured.

It is also an object to provide, as the sole non-epoxide source material for the curing agent, an $=NH$ compound which can be made in a simple process from relatively inexpensive chemicals.

Still other objects will be made apparent to those knowledgeable in the art by the following specifications and claims.

SUMMARY OF THE INVENTION

In a method aspect, the present invention may be broadly defined as the process, for making an N-substituted benzo-N-heterocycle having utility as a latent phenolic component of epoxy resin systems, in which:

at least one YH group in a compound of the following formula (1)

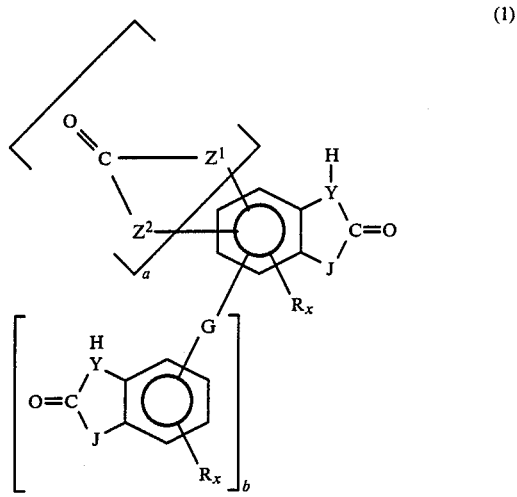

is reacted with a D group in a compound of the formula (2)

$$[Q\text{-}D]_m \qquad (2)$$

wherein in formula (1),
one of a and b is zero and the other is zero or 1;
one of $Z^1$ and $Z^2$ is YH and the other is J and, when $a=1$, $Z^1$ and $Z^2$ are attached to adjacent ring carbons;
x, independently in each occurrence, is 0, 1 or 2;
R is a non-interfering substituent, independently the same or different in each occurrence;
G is a valence bond, an alkylene or alkenylene group—optionally halosubstituted, CO, O, S, SO, $SO_2$, SiO, etc.;
Y is

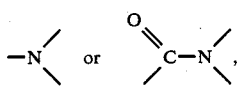

independently in each occurrence;

J is O or S, independently in each occurrence; and the number of Y-H groups in the molecule is 1 or 2; and in formula (2), Q is an organic radical, m is an integer of from 1 to 7, and D is a group (such as, for example,

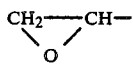

or X—CH₂—CO—NH—, X being a halogen radical) which will react with the

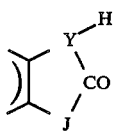

moiety (a) which includes the Y-H group to convert the latter moiety to a

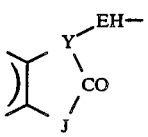

moiety (b) wherein EH is an active H containing group,

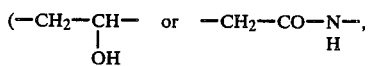

for example) of a nature such that the moiety (b) can be caused to rearrange to a moiety (c) (such as, for example,

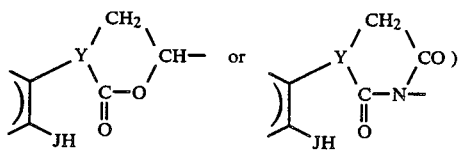

comprising an oxirane-reactive —OH or —SH group and a stable ring.

In a broad composition aspect, the invention is a rearrangeable, latent mono- or polyphenol which is deriveable by the reaction of a compound of formula (1) with a compound of formula (2), i.e., is a latent mono- or polyphenol which is of one of the following formulas (3)$_A$ and (3)$_B$ (or (3)$_C$, presented and defined later herein):

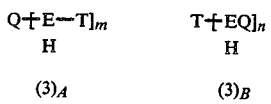

wherein m is an integer having a value of from 1 to 7, n is 1 or 2, T is a compound of formula (1) from which each of the (one or two) YH protons has been removed and each of T, EH and Q, independently, is the same or different in each occurrence. It will be apparent that reaction products of monoepoxides with monofunctional YH compounds of formula (1) may be represented either by formula (3)$_A$, m being 1, or by formula (3)$_B$, n being 1; i.e., as

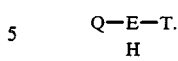

Compounds of formula (1) preferred for the practice of the invention are those in which x is zero in all occurrences and/or J is 0 in all occurrences. In formula (2), D is preferably a 1,2-oxiranyl radical. Among the compounds of formula (2), triglycidyl ethers of 1,1,1-tri(hydroxyphenyl) alkanes and alkenes, i.e., those in which m is 3, D is

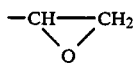

and Q is

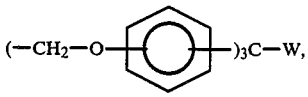

(W being H, alkyl or alkenyl) are especially preferred. See U.S. Pat. No. 4,394,496.

Presently, the most preferred compounds of formula (3)$_A$ are those in which m is 2 or 3 and the most preferred compounds of formula (3)$_B$ are those in which n=2.

A particularly preferred embodiment of the invention is a mixture of one or more compounds of formula (3)$_A$ and/or (3)$_B$ with an epoxy resin, the mixture constituting a single phase, at least when molten. A mixture of this type which has been cured by heating it to "liberate" the latent phenolic function(s) and react them with oxiranes (and secondary alcoholic hydroxyls, when present) in the resin is correspondingly preferred. The rearrangement step does not have to be carried out in the presence of a phenolic-reactive material and is another process aspect of the invention.

Those compounds of formula (3)$_A$ and (3)$_B$ which contain more than one latent phenolic (includes thiophenolic, henceforth) function have direct utility as chain extenders or cross-linkers for epoxides. Those which contain only one latent phenolic have utility as capping agents or functionality reducers for polyepoxides. The compounds of formula (3)$_A$, at least, should have utility as intermediates for synthesis of bio-active materials.

TERMINOLOGY

By the term "non-interfering substituent" is meant one which it is synthetically feasible to incorporate in the compound of formula (1) and which does not detrimentally affect, to an intolerable extent, either the formation or rearrangement of the corresponding compound of formula 3.

Epoxides are characterized herein as mono- or polyepoxides, according to the number of oxirane groups per molecule of the epoxide, prior to any reactions with a benzo-N-heterocycle. Specific benzo-N-heterocycles of formula (1) (see sub-formulas (1)$_{A,B,C}$) are characterized as being mono- or difunctional according to the number of oxirane-reactive NH groups initially present in the molecule, despite the fact that a latent phenolic —OH (or thiophenolic —SH) function is also "present" for each such 13 NH group. Thus, a nominally monofunctional NH compound can in fact "react out" two oxirane groups (generally in two different epoxide molecules, regardless of functionality) and in this sense is a difunctional chain extender or cross-linker. A "1:1 adduct" is formed by the reaction of one NH in one molecule with one oxirane in another molecule, regardless of the functionality, in whatever sense, of either of those two molecules. A "2:1 adduct" is formed by the reaction of one NH or oxirane group in each of two, separate molecules with one of the two or more oxirane or NH groups present in a third molecule, regardless of the functionality, in whatever sense, of those three molecules. The effective functionality, as a cross-linker, of benzoxazine dione is discussed subsequently herein.

The compound of formula (1)$_A$ in which Y is N, J is O and x=0 is named according to more systematic nomenclature as 2-(3H)-benzoxazolinone but the older name, 2-(3H)-benzoxazolone, will be used herein for convenience and because the compound is identified by the latter name (or simply as 2-benzoxazolone) in most of the literature of organic chemistry.

It is to be noted that the term "deriveable", as used herein, is not to be taken as synonymous with "derived"'—which is intended to be a more limiting term. Those compounds characterized as deriveable in a particular manner must indeed be at least theoretically so deriveable but may actually have been derived in any manner.

It is a particular advantage of the present invention that, in the preparation of the latent curing agents from epoxides, sufficiently high temperatures (up to 160° C., for example) may be employed to reduce the viscosities of most epoxy resins enough to facilitate mixing in (and reaction) of the benzo-N-heterocycle, without causing the rearrangement of the resulting adducts (the latent curing agents) required for chain extension or cross-linking of the epoxy. If the epoxide is still excessively viscous at the desired temperature, a liquid epoxy or reactive diluent may be employed which, with appropriate stoichiometry, can be substantially utilized in formation of the latent curing agent.

DETAILED DESCRIPTION

The following radicals are considered representative of the non-interfering R groups which may be present on the benzo-ring in the compounds of the foregoing formulas (1) and "(3)": cyano, halo, nitro, $C_1$–$C_5$ alkoxy, phenoxy, $C_1$–$C_5$ alkyl or alkenyl, $C_6$–$C_{10}$ aryl, aralkyl or alkaryl and $C_1$–$C_5$ alkylthio.

The compounds of formula (1) constitute three subgroups represented by the following sub-formulas (1)$_A$, (1)$_B$ and (1)$_C$, in which all symbols retain the meanings assigned earlier herein:

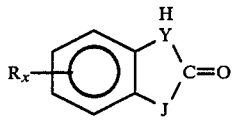

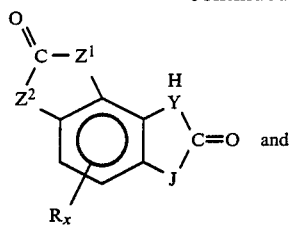

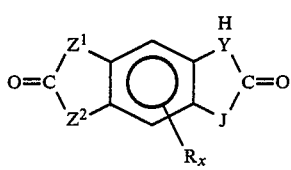

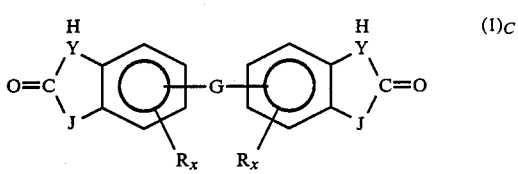

If a compound of formula (1)$_A$ is reacted with a compound of formula (2) containing only one D function (i.e., m=1), the reaction mixture should comprise no 2:1 or 1:2 reaction products. Likewise, if a polyfunctional compound of formula (2) is reacted with an excess of a compound of formula (1)$_A$, the reaction mixture should consist essentially of unconverted formula (1)$_A$ molecules and product molecules of formula (3)$_A$. Again, if an excess of a monofunctional compound of formula (2) is reacted with a compound of either of formulas (1)$_B$ and (1)$_C$, the product molecules in the reaction mixture should be of the formula (3)$_B$. However, if a compound of either of formulas (1)$_B$ and (1)$_C$ is reacted with a polyfunctional compound of formula (2), the reaction mixture should comprise a variety of products of formula (3), the identities and relative amounts of which will depend on the number ratio of YH to D groups provided by the reactants; the presence of unconverted Y-H or D groups in at least some of the product molecules would be anticipated.

It should also be noted that reaction of a high equivalent weight polyfunctional $QD_m$ compound with even (an excess of) a monofunctional YH compound may result in substantial proportions of product molecules of the formula (3)$_C$:

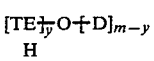

wherein y is an integer smaller than m. (Of course, some oligomeric products would be expected to form when a polyfunctional epoxide, for example, is reacted with a polyfunctional YH compound.)

Accordingly, the expression "formula (3)" will henceforth be used as appropriate to designate a compound or compounds of any of formulas (3)$_A$, (3)$_B$ and (3)$_C$.

Illustrative of latent diphenolic compounds of formula (3) deriveable from compounds of formulas (1)$_A$, (1)$_B$ and (1)$_C$ are the following:

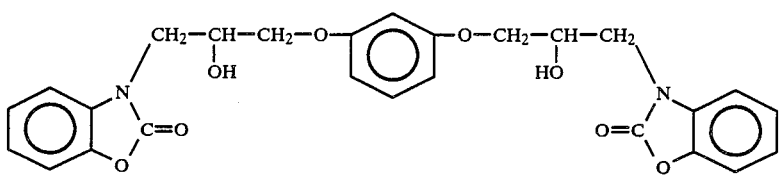

(4)

C$_{27}$H$_{26}$N$_2$O$_8$
M = 506.492

The 2:1 adduct of 2-(3H)-benzoxazolone with the diglycidyl ether of resorcinol. A compound of formula (3)$_A$ in which m=2, EH=—CH$_2$—CHOH—,

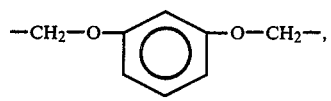

and T is derived from a compound of formula (1)$_A$ in which x=0, Y=N and J=O.

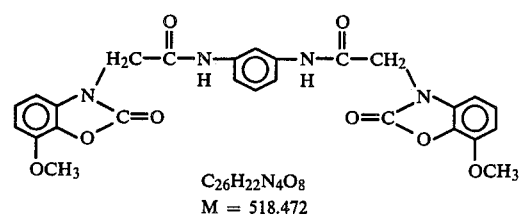

(5)

C$_{26}$H$_{22}$N$_4$O$_8$
M = 518.472

The 2:1 reaction product of 7-methoxy-2(3H)-benzoxazolone with Cl—CH$_2$—CO—NH—C$_6$H$_4$—NH—CO—CH$_2$—Cl. A compound of formula (3)$_A$ in which m=2, Q=phenylene, EH=—CH$_2$—CO—NH— and T is derived from a compound of formula (1)$_A$ in which x=1, R=CH$_3$O, Y=N and J=O.

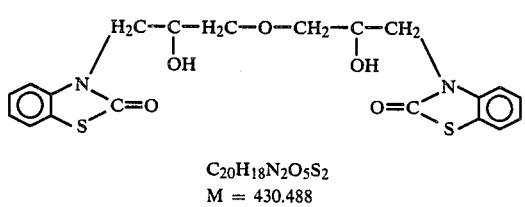

(6)

C$_{20}$H$_{18}$N$_2$O$_5$S$_2$
M = 430.488

The 1:2 adduct of diglycidyl ether with 2-(3H)-benzothiazolone. A compound of formula (3)$_A$ in which m=2, EH=—CH$_2$—CHOH—, Q=—CH$_2$—O—CH$_2$— and T is derived from a compound of formula (1)$_A$ in which x=0, Y=N and J=S.

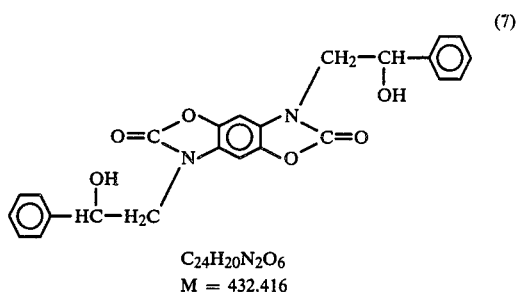

(7)

C$_{24}$H$_{20}$N$_2$O$_6$
M = 432.416

The 2:1 adduct of styrene oxide with a reaction product of phosgene with 1,4-dihydroxy-2,5-diamino benzene. A compound of formula (3)$_B$ in which n=2, EH—=—CH$_2$—CHOH—, Q=phenyl and T is derived from a compound of formula (1)$_B$ in which Y=N, J=O, Z$^1$ is para to J and Z$^2$ is para to YH.

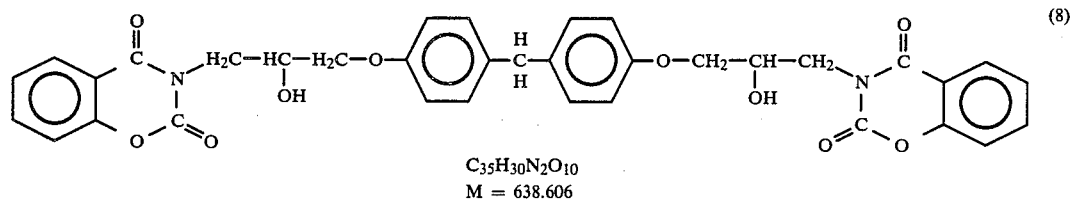

(8)

C$_{35}$H$_{30}$N$_2$O$_{10}$
M = 638.606

The 2:1 adduct of benzoxazinedione with the diglycidyl ether of bisphenol-F. A compound of formula (3)$_A$ in which m=2, EH=—CH$_2$—CHOH—, Q=p,p'-bis(methyleneoxy)diphenylmethane and T is derived from a compound of formula (1)$_A$ in which x=0, Y=—CO—NH— and J=O.

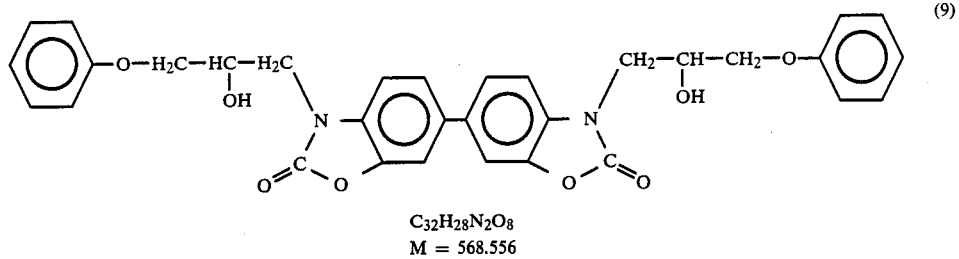

(9)

$C_{32}H_{28}N_2O_8$
M = 568.556

The 2:1 adduct of phenyl glycidyl ether with a reaction product of phosgene with m,m'-dihydroxy-p,p'-diaminodiphenyl. A compound of formula (3)$_B$ in which n=2, EH=—CH$_2$—CHOH—, Q=phenoxy and T is derived from a compound of formula (1)$_C$ in which x=0 in both occurrences, Y=N, J=O, G is a valence bond and the YH groups are in the p and p' positions.

Latent monophenols of formula (3)$_A$ or (3)$_B$ having utility as reactive diluents, capping agents or functionality reducers for higher functionality polyepoxides are exemplified by the following compounds:

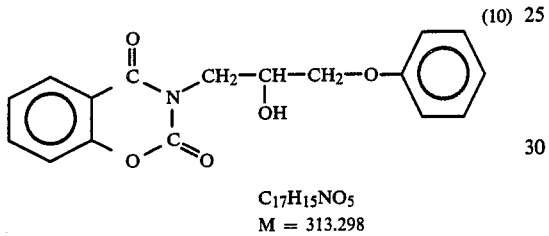

(10)

$C_{17}H_{15}NO_5$
M = 313.298

The 1:1 adduct of benzoxazinedione with phenyl glycidyl ether. A compound of formula (3)$_A$ in which m=1, EH=—CH$_2$—CHOH—, Q=—CH$_2$—O—C$_6$H$_5$ and T is derived from a compound of formula (1)$_A$ in which x=0, y=—CO—n— and J=0.

(11)

CHOH— and T is derived from a compound of formula (1)$_A$ in which x=2, R=Br, Y=N and J=O; will increase flame retardancy when included in epoxy compositions.

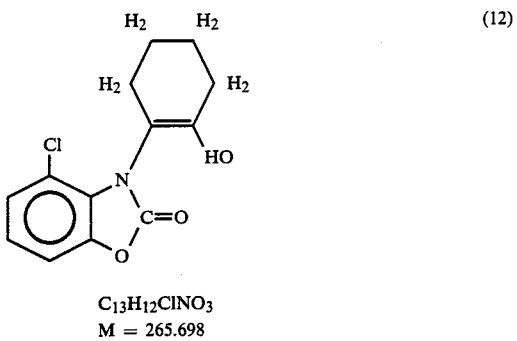

(12)

$C_{13}H_{12}ClNO_3$
M = 265.698

The enol form of a reaction product of 4-chloro-2-(3H)-benzoxazolone with 2-chlorocyclohexanone. A compound of formula (3) in which m=1,

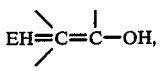

Q=tetramethylene and T is a compound of the formula (1)$_A$ in which x=1, R=Cl, Y=N and J=O.

Latent monophenols of the formula (3)$_C$ are exemplified by the following compound.

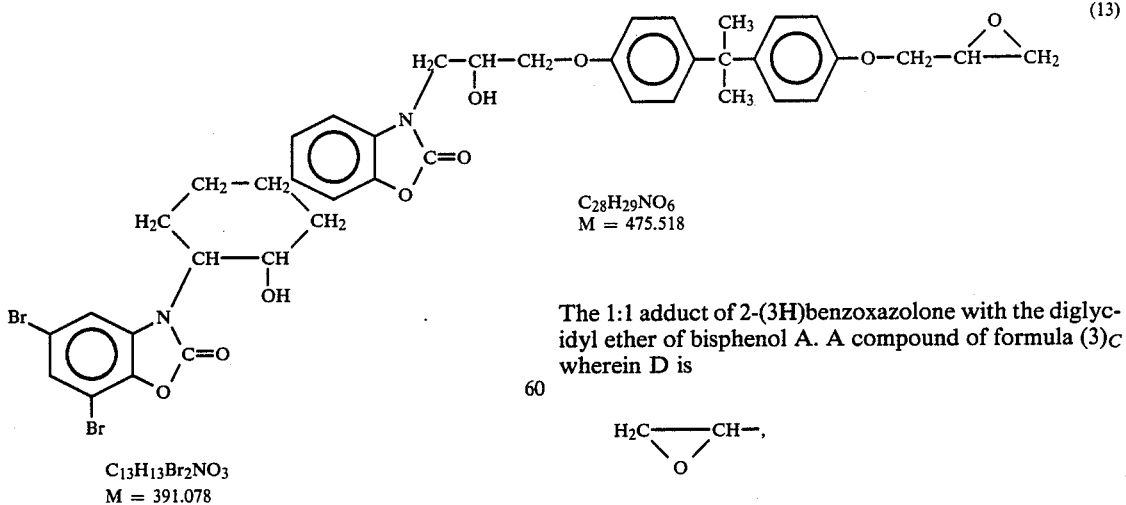

(13)

$C_{28}H_{29}NO_6$
M = 475.518

The 1:1 adduct of 2-(3H)benzoxazolone with the diglycidyl ether of bisphenol A. A compound of formula (3)$_C$ wherein D is

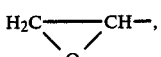

$C_{13}H_{13}Br_2NO_3$
M = 391.078

The 1:1 adduct of 4,6-dibromo-2-(3H)-benzoxazolone with cyclohexene oxide. A compound of formula (3)$_B$ in which n=1, Q is tetramethylene, EH is <CH—

Q is —CH$_2$—O—C$_6$H$_4$—C(CH$_3$)$_2$—C$_6$H$_4$—O—CH$_2$—, EH is —CH$_2$—CHOH—, m is 2, y is 1 and T is derived from a compound of formula (1)$_A$ in which x=0, Y=N, and J=O. This adduct, upon rearrangement, is a homopolymerizeable monomer containing one phenolic —OH and one oxirane per molecule.

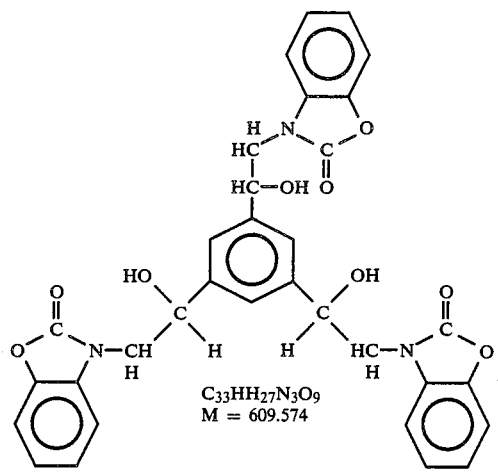

(14)

C₃₃HH₂₇N₃O₉
M = 609.574

The 3:1 adduct of 2-(3H)-benzoxazolone with 1,3,5-trivinyl benzene trioxide. A compound of formula (3)$_A$ in which m=3, EH=—CH₂—CHOH, T is derived from a compound of formula (1)$_A$ in which x=0, Y=N and J=O, and Q is

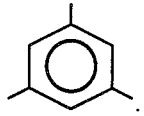

This adduct, upon rearrangement is a trifunctional phenolic cross-linker. Mixtures resulting from formation of the adduct in the presence of an excess of the triepoxide would be expected, when cured, to have a high density of cross-links and a correspondingly high heat distortion temperature.

Suitable Benzo-N-heterocycles

The starting materials of formula (1) which are not commercially available per se can be prepared from the corresponding mono- or difunctional phenols (or thio phenols), ring substituted ortho to the —OH or —SH groups by —NH₂ groups. The o-amino phenols are reacted in a known manner with phosgene or trichloromethyl chloroformate ("diphosgene" or "liquid phosgene"—sold by Alfa Products (Morton-Thiokol, Inc.)). The ortho amino phenols themselves are made by well known procedures—most notably, by reduction of the corresponding o-nitrophenols.

Known benzo-N-heterocycles of formula (1)$_A$ include 2-(3H)-benzoxazolone, 2-(3H)-benzothiazolone, 5- and 6-chloro-2-(3H)-benzoxazolones and 7-methoxy-2-(3H)-benzoxazolone and the benzoxazinediones, disclosed by F. Effenberger et al., Chem. Ber., Vol. 105, 1972; page 1933, as being of the formula

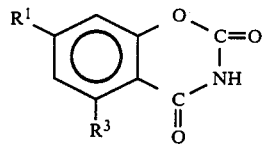

wherein R¹ and R³ are as tabulated below:

| R¹ | R³ |
|---|---|
| H | CH₃ |
| H | OCH₃ |
| H | Cl |
| CH₃ | CH₃ |
| OCH₃ | OCH₃ |

Known o-aminophenols include 2-amino-3-chlorophenol, 2-amino-4-chloro-5-nitrophenol, 2-amino-6-chloro-4-nitrophenol, 2-amino-4,6-dibromophenol, 2amino-3,5-dichlorophenol, 4,6-diamino-resorcinol, 2,3-diaminoquinol and 2,5-diaminoquinol.

Suitable Epoxides (and Thioepoxides)

Epoxides in which the oxirane groups present therein are more reactive with —NH groups in the benzo-N-heterocycles than are any other functions present therein are considered generally suitable for the practice of the present invention. Such epoxides include mono- and polyoxirane compounds, oligomers and polymers and may be saturated or unsaturated, cycloaliphatic, aliphatic or heterocyclic. They may include from one to five or more non-interfering substituents and may be O- or N-glycidyl derivatives, olefin oxides, glycidyl ethers or esters, hydantoin epoxides, epoxy novolacs, etc. Suitable glycidyl compounds include those in which the glycidyl moiety is of the formula

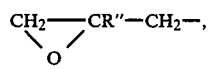

wherein R″ preferably is H or CH₃.

As a general rule, epoxides used, ex situ, to prepare latent curing agents of the invention (not formed in admixture with the epoxy resins they will be used to cure) will be lower molecular weight, mono- or difunctional epoxides—particularly when used in excess to prepare latent curing agents which are to be isolated substantially free of unconverted starting materials. This applies also to the preparation of relatively small, difunctional compounds intended to be used as chain extenders.

On the other hand, where the latent curing agent is made in situ, the epoxide will generally be of sufficient molecular weight to have respectable physical properties, i.e., will generally be epoxy resins. Most widely used among the latter epoxides are two-stage reaction products of epichlorohydrin with the dinuclear "bisphenols", most notably bisphenol A, the reactions being carried out under conditions conducive to chain growth. The resulting glycidyl-terminated, polyhydroxy, polyethers generally have oxiran functionalities of from about 1.5-2 and may be represented by the following idealized formula:

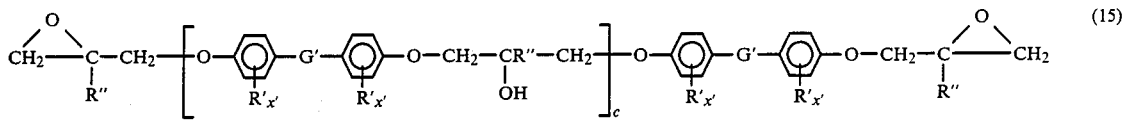

(15)

wherein R', R", x' and G' are defined as are R, R", x and G, respectively, earlier herein and c is an integer having a value of from about 0 to about 90. A typical commercial epoxide of this type is DER-667 (Dow Epoxy Resin-667; registered trademark of The Dow Chemical Company) which has an equivalent weight of about 1600–2000, c being 10–13 and R" being H.

Epoxy novolacs are another commercially important type of higher molecular weight epoxides; these generally have oxirane functionalities of from about 3 to 7 or higher. They are also prepared in two main stages: a phenol is condensed with a ketone or aldehyde—formaldehyde, most notably—to produce a linear chain of hydroxyphenyl groups alternating with intervening alkylene links and then the phenolic hydroxyls are converted (in two steps) to glycidyl ether groups with epichlorohydrin. A typical commercial epoxy novolac is DEN-438; mol wt. ~630, eq. wt. ~180 (Dow Epoxy Novolac 438, a registered trademark of The Dow Chemical Company). Branched epoxy novolacs are glycidyl ethers of poly(hydroxyphenyl)alkanes, such as 1,1,2,2-tetrakis(p-hydroxyphenyl)ethane, for example. Particularly good combinations of physical properties are possessed by the triglycidyl ethers of "tris-phenols" in which all three hydroxyphenyl groups are attached to the same end-carbon in a $C_1$–$C_{10}$ alkane (or alkene); also, higher functionality, oligomeric versions of these epoxides are readily made and have excellent properties (see U.S. Pat. No. 4,394,496, assigned to Dow). Branched epoxy novolacs having oxirane functionalities of from 5 to 10 or more are preparable by the "epoxidation" of novolacs made by the reaction of mono- or dihydric phenols with mono- or dinuclear diphenols ring-substituted with 3- or 4-methyol or alkoxymethyl groups (see U.S. Pat. No. 4,474,929, also assigned to Dow).

Thioepoxides, i.e., compounds comprising —NH-reactive episulfide groups of the formula

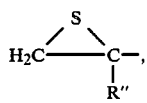

wherein R" is lower alkyl, preferably H or $CH_3$, most preferably H, are also considered suitable for reaction with YH groups in the practice of the present invention.

In one embodiment of the present invention, the benzo-N-heterocycle is reacted "in situ" with a substantial excess of a low molecular weight, liquid epoxide and a higher molecular weight epoxide is then melt-blended with the resulting reaction mixture. Preferably, however, the low and high molecular weight epoxides are blended before the benzo-N-heterocycle is mixed in and reacted.

Benzoxazinedione as a Latent Polyfunctional Cross-linker

One molecule of benzoxazinedione,

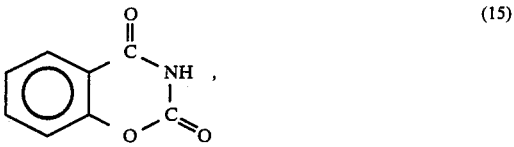

(15)

can react out a total of three oxirane groups. It has not been unequivocally established that the structure of the reaction product with the first oxirane is of the type illustrated by the preceding formula (8). It is reasonable to postulate such a structure as at least a transient intermediate. However, an "abnormal" rearrangement (prior to reaction with a second oxirane) to an intermediate of a structure such as, for example,

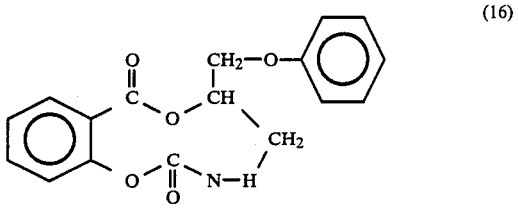

(16)

which contains a less, but sufficiently-reactive —NH group, is apparently required. Whatever the correct structure, the initial adduct has a latent functionality of two for each benzoxazinedione molecule incorporated therein. The reaction of the NH group with a second oxirane generates a stable species which apparently contains a —$CH_2$—CHOH— group and will rearrange in the "normal" manner at a more elevated temperature to produce an oxirane-reactive phenol such as

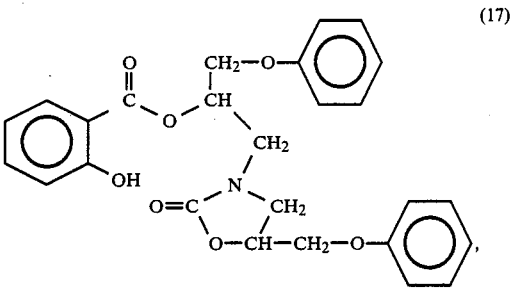

(17)

for example, which can react with a third oxirane.

The resultant tri-functionality of the dione as an oxirane-reactive molecule was surprising. It was expected that if an NH group were regenerated in the initial rearrangement it, being necessarily part of a carbamate group, rather than an amido or imido group, would not be sufficiently reactive at temperatures below those normally required for curing of epoxides. (Of course, the present invention is not predicated on a correct understanding of the reaction mechanisms involved.)

It will be appreciated that because benzoxazinedione is effectively trifunctional, latently difunctional chain extender or curing agent molecules can be produced simply by reacting the dione with a monoepoxide, such as, for example, glycidol or glycidyl methacrylate.

Similarly, because compounds of formula $(1)_A$ can react out two oxirane groups, they are, in effect, difunctional, although nominally monofunctional. Further, if a solution of the $(1)_A$ compound in an epoxide can be formed at a low enough temperature (and in the absence of catalysts), the rate of NH conversion will be quite slow or practically nil and *both* of the oxirane-reactive functions will be latent. However, curing can still be effected in two separate stages (providing adequate cooling can be attained during the first stage). Preparation of such a solution of course requires an epoxide or mixture of epoxides (and reactive diluents and/or solvents) which is fluid at less elevated temperatures (say up to about 100° C. and assuming that the solution, once formed, is cooled.

The mixture obtained by reacting a benzo-N-heterocycle with an NH-reactive material will not necessarily be curable at all or may not be curable simply by heating. However, if the mixture includes a latent, difunctional phenol it may be useful as a chain-extender or cross-linker for resins—epoxies, most notably—which can be cured with phenolics. An example of this option would be a 2:1 reaction product of 2-(3H)-benzoxazolone with a compound containing two $Cl-CH_2-CO-NH-$ functions, the latter compound not containing any phenolic-reactive function.

If an excess of a benzo-N-heterocycle capable of reacting out only two oxirane (one on each of two epoxide molecules) is adducted with a difunctional epoxide, the resulting mixture—assuming complete oxirane conversion—will comprise essentially only unconverted molecules of the heterocycle and a single latent diphenol (the 2:1 adduct). This mixture, alone, will be uncurable. However, if an excess of the epoxide is employed, a statistical mixture of unconverted diepoxide, one or more latent monophenols (1:1 adducts) and the latent diphenol will result. This mixture will be curable alone, i.e.—without adding an epoxide to it.

Similarly, if a benzo-N-heterocycle capable of converting only two oxiranes is reacted with a monoepoxide—in whatever proportions—the resulting mixture will not be truly self-curing.

It will be appreciated that when benzoxazinedione is mixed with an epoxide (or mixture of epoxides) in an amount such that the total number of YH and J groups provided per oxirane group is 0.5, the effective equivalent ratio of oxirane-reactive functions to oxiranes will be $3/2 \times 0.5$ or 0.75. Correspondingly, a ratio of about 1:1 can be attained by using enough of the dione to provide a total of about 0.67 equivalents of YH and J groups per oxirane.

General Reaction Procedures

It is generally preferred, for reactions of the benzo-N-heterocycles with epoxides or epoxy resins (or other materials capable of reacting with the NH group to form a product capable of liberating a phenolic group or regenerating an active NH group upon rearrangement) that the reaction mixture be fluid throughout the course of the desired reaction(s). However, it is essential that the temperatures of the reaction mixture does not exceed a limiting value for more than a brief time interval. That is, if the temperature required for adequate fluidity is high enough so that the rate of a following, as yet undesired reaction is comparable to the rate of the desired reaction, the product obtained will be too "advanced". Resort must then be had to some expedient to make the reaction mixture adequately fluid at a lower temperature. Such expedients will be apparent to experienced resin chemists but several will be mentioned for the benefit of those less knowledgeable. As indicated earlier herein, solvents (which can be removed prior to curing), reactive diluents or lower melting (lower molecular weight) epoxy resin may be included in the reaction mixture. The ratio of the reactants and/or the sequence or mode of combining them may be altered. A mixture of two or more benzo-N-heterocycles may be lower melting or form a lower melting mixture with the other reactant than a single benzo-N-heterocycle.

When a catalyst (for the subsequent rearrangement) is used, it generally should not be stirred in until the adduction step is completed (and the adduction mixture cooled, adviseably).

As a general guide, premature gelling or cross-linking can usually be avoided by holding the temperature of the adduction mixture below about 160° C., preferably below about 150°. Temperatures of about 100° are generally sufficiently high so that the first stage of reaction can be completed in a relatively short time period. If adequate fluidity can be achieved at a low enough temperature, complete inter-dissolution of the reactants may be achieved without onset of the first reaction. The resulting solution, whether mono- or polyphase when cooled, can be a uniform, intimate mixture of an at least difunctional chain extender or cross-linker with an epoxy resin; the mixture has a very long shelf life at ordinary temperatures and can be put in a mold, spread on a surface or used as an impregnant, at a moderately elevated temperature, then selectively gelled or cured in place by heating to more elevated temperatures. (The latter type of composition is particularly suitable as a 1 part epoxy adhesive which can be cured, simply by heating and with no formation of voids or evolution of volatiles.

The basic general reaction procedure is quite simple: an adduction catalyst is generally not required and the benzo-N-heterocycle is added incrementally to a melt (or solution) of the epoxide (or other NH-reactive material), under nitrogen and with good stirring, at a temperature below that at which the rate of rearrangement of the initial reaction product is appreciable. The reaction is allowed to proceed until the EEW of the mixture has increased at least to a preselected value (or some other appropriate criterion of oxirane conversion has been satisfied). Any solvent present may then be removed to the extent feasible without reaching a pot temperature conducive to rearrangement (or NH regeneration, in the case of a benzoxazinedione). The hot resin is then poured out of the reaction vessel onto a foil and allowed to cool—or may be transferred to a mold—for example, and cured by further heating. A catalyst may be added to speed up the rearrangement or the curing reaction, but is not needed. Alternatively, the reaction mixture (or solution) may be mixed—at an appropriate temperature—with another epoxide (including reactive diluents) or with more of the same epoxide or with a different type of resin with which it is blendable.

Shelf Lives, Pot Lives and Gel Times

The ideal latent-cure resin system has a long shelf life and a long pot life but will gel rapidly when moderately further heated. If the system is inherently sluggish, i.e., not very reactive, long shelf and pot lives are assured but a catalyst will generally have to be added when the resin is heated to the application temperature in the holding kettle or "pot", thereby reducing pot life. If the catalyst is instead included in the system when first made, some decrease in shelf life can also be anticipated. That is, a not very satisfactory compromise is generally necessary with conventional latent systems. However, the latent compositions of the present invention are different. A catalyst is not required but may be employed to advantage and may be incorporated in the composition when formed. That is, the truly "one-part" systems of the invention can include a catalyst. Not only is shelf life still excellent but, with some catalysts, the reaction (rearrangement and cross-linking or chain extension) onset is actually delayed until a higher pot temperature is attained. Thus, the more rapid subsequent gelling made possible by the catalyst is not attained at the expense of reduced pot life. Other catalysts do not delay reaction onset but still do not seriously reduce pot life. The "some" catalysts referred to above are phosphonium acetate type catalysts which have been pre-reacted with a strong acid, the anion of which is non-nucleophilic and exchanges with the acetate ion. The liberated acetic acid need not be removed but can be eliminated by addition of water, which precipitates the newly formed phosphonium compound and retains the acetic acid in the liquid phase, which may be readily separated by filtration.

Ideal or "target" properties for a latent system are as follows. A system which does not self-react to the extent of more than 5% when held at 30° C. for six months or does not more than double in average degree of polymerization in two weeks at 50° C., but gels (self-converts) to the extent of about 50% or more) in 2 hours at 175° C., is considered outstanding. It will be apparent from the following examples that this ideal is largely attainable in the practice of the present invention.

EXAMPLES

The following examples are for purposes of illustration and are not to be construed as limiting the present invention in a manner inconsistent with the claims in this patent.

I. PREPARATIONS

Example 1

Preparation of 2:1 adduct of 2-(3H)-benzoxazolone with low molecular weight, difunctional epoxide and use of adduct to cure more of the same epoxide.

A. 2-(3H)-benzoxazolone, 1.35 grams (0.01 moles) was added to 1.74 grams (0.005 mole; 0.01 equiv. oxirane) of DER-332; registered trademark of The Dow Chemical Company for the diglycidyl ether of bisphenol A, and the mixture was heated at 150°-160° C. for 10 minutes. On cooling, crystallization occurred. However, after another 20 minutes at 150°-160° C. (and cooling), the mixture formed a homogeneous, hard, brittle and glassy resin having an EEW (Epoxide Equivalent Weight) of 1920, indicating about 91% oxirane conversion.

B. 0.5 Grams of the latter resin was mixed with 0.28 grams more of the same diglycidyl ether (thus providing a 1:1 ratio of oxirane to active H-including latent phenol —OH groups) and the mixture was heated. A homogeneous solution readily formed. Upon heating 30 minutes at about 200° C., the mixture cured to a thermoset solid which was stable at 200° C. and, according to subsequent characterizations of essentially identically prepared resins, had an HDT (Heat Distortion Temperature) of about 125° C.

Example 2

Preparation of 2:1 adduct of benzoxazinedione with DER-332.

A 500 ml round-bottomed flask equipped with a mechanical stirrer and thermocouple probe was charged with 0.297 g. moles epoxy resin DER-332 (103.3 g, 0.594 equiv. epoxide) and heated to 100° C. under nitrogen. 0.543 Moles of powdered 3,1-benzoxazine-2,4-dione, (96.7 g, 0.593 equiv. available N—H) was added to the stirred resin in a first increment of about 1/5 of the total. The reaction temperature was brought to 150° C. and the remaining 4/5 added in portions such that the reaction temperature remained in the range of 150°-160° C. After all the benzoxazinedione had been added, the reaction was continued until the mixture had an EEW of over 4000, after which it was poured onto foil to cool. The product was a hard, glassy, brittle, light amber resin which had a Mettler softening point of 101° C.

Example 3

Preparation of 1:1 adduct of 2-(3H)-benzoxazolone with DER-332.

A 250 ml round-bottomed flask equipped with a mechanical stirrer and thermocouple probe was charged with 0.207 g. moles of epoxy resin DER-332 (72.05 g., 0.414 equiv. epoxide) and heated to 150° C. under nitrogen. 2-Benzoxazolone, 27.95 g., 0.207 equiv. available N—H, was added in three equal portions at a rate to maintain the reaction temperature in the range of 150°-160° C. After the last portion had been added, the reaction was held at 150° C. for 1 hour, then poured onto foil to cool. The product was a hard, but sinterable, glassy solid resin with a Mettler softening point of 69° C. Resin EEW was 505 (theoretical was 483).

Example 4

Preparation of 3:1 adduct of 2-(3H)-benzoxazolone with tris-(p-glycidyloxyphenyl)methane and incorporation of the adduct as a latent curing agent in a mixture of more of the tris-epoxide with DER-332.

A. A 500 ml. round-bottomed flask equipped with a mechanical stirrer and a thermocouple probe was charged with 119.2 grams of the tris-epoxide, which provided 0.722 equivalents* of oxirane. The epoxide was heated to 150° C. under nitrogen and, with stirring, 97.6 grams (0.722 equiv. NH) of the benzoxazolone was added portionwise at a rate such that the temperature of the flask contents stayed within the range of 150°-160° C. After addition, the mixture was stirred for 90 minutes at ~150° C. A sample of the resulting reaction product (A) was found to have an EEW of 4442.

*The EEW for XD-7342, the tris-epoxide used, was 165 (vs 153.3 theoretical). This reflects some oligomerization during preparation of the epoxide; see U.S. Pat. No. 4,394,496.

B. A mixture of 104.4 grams (0.633 equiv. oxirane) of the tris epoxide with 78.8 grams (0.543 equiv. of oxirane) of DER-332 was prepared by melt blending at 100° C. This mixture was slowly added, with stirring, to the foregoing product A at 150° C., held 10 minutes at that temperature and then poured onto foil to cool. The resulting solid was an amber, glassy resin which was hard but sinterable and had an EEW of 396 (vs 340, theoretical); it has a Mettler softening point of 86° C.

Example 5
Preparation of 2:1 adduct of 5-chloro-2(3)-benzoxazolone with DER-332 and of a mixture of the adduct with "XD-7342", a technical grade (EEW 176) of tris(p-glycidyloxyphenyl)methane having a higher content of oligomers. Overall equiv. ratio of oxirane-reactive groups (—NH; latent —OH) to oxiranes=0.8.

A. 51.63 Grams (0.147 g moles; 0.294 equiv.) of DER-332 (EEW=175) was heated under $N_2$, with stirring, to about 160° C. Over a period of 3 minutes, 50 grams (0.295 g moles; 0.295 equiv. NH) was added; the temperature of the mixture dropped to 120° and two phases were present. Over a period of 34 minutes, the temperature was raised to 165°, at which point the mixture appeared to be a homogeneous solution. Heating was continued and the temperature further increased to 185° in about 8 minutes; thereafter the temperature was held within the range of 170°-180° for 24 minutes, at which point a sample (found to have an EEW of about 906) was taken of the mixture. A second sample, taken after 40 minutes at 165°-180°, had an EEW of 1382. After 22 minutes at 180°-190°, a third sample had an EEW of 2260 and the heating mantle (and insulation) were removed.

B. Three minutes later, the temperature of the adduction mixture was 170° and 77.8 grams (0.221 g moles; approximately 0.44 g equiv.) of the tris-epoxide was added as a melt (temperature 110° C.) and stirring was continued for another 13 minutes while heat was applied as necessary to hold the temperature of the resulting solution at about 150°. When poured onto aluminum foil, the mixture formed a light brown, non-sintering solid mass having a melting point of about 191° C.

The total residence time for the adduction reaction at 160°-190° was about 1¾ hours.

It will be seen that the presence of the chlorine substituent on the benzoxazolone substantially reduced the reactivity of the —NH group (and of the adduct).

Example 6
Preparation of compound of formula (7) herein, by reaction of phosgene with 1,4-diamino-2,5-dihydroxybenzene.

49.68 Grams (0.5914 moles) of reagent grade $NaHCO_3$, 600 mg. of reagent grade $SnCl_2$ (as a stabilizer for the benzene compound), 500 ml of $CH_2Cl_2$ and 400 ml of deionized water were charged to a 2-liter flask fitted with a mechanical stirrer, a temperature monitoring device, a pressure balanced dropping funnel and a cold-finger condenser. The flask contents were chilled to 7° C. and 19.75 grams (0.0927 moles) of recrystallized dihydrochloride of the diaminodihydroxybenzene was added with stirring (and $CO_2$ evolution). 0.2817 Mole of phosgene (209 ml of a 1.35 molar solution in $CH_2Cl_2$) and about 60 ml of $CH_2Cl_2$ (rinse) was put in the dropping funnel and added to the flask contents over a 40-minute period at a pot temperature of 5°-10° C. The resulting mixture was stirred 40 minutes at 5° C., allowed to warm to room temperature (with stirring), refluxed (~36°-37°) for in excess of an hour, allowed to cool with stirring and allowed to phase separate. The $CH_2Cl_2$ phase tested phosgene-free. The aqueous phase, which included a dispersed solid, was separated and filtered. The solid filtrand was washed twice with 200 ml portions of water, cold MeOH and diethyl ether, each, and then dried in vacuo at 60°-70° C. The dried product weighed 17.24 grams (96.8% of theory for the desired dione). A portion of this product, when recrystallized from hot DMF (dimethyl formamide), had a melting point of 218° C., and the correct C, H and N contents for the desired dione and was further identified by infrared and NMR spectroscopy as the compound of formula (7) herein.

II. EFFECTS OF SYSTEM COMPOSITION ON REACTION ONSET TEMPERATURE, GEL TIME AND SHELF LIFE

Example 7
Ability of various catalysts to promote rearrangement of the adducts of the invention (which is equivalent to promoting chain extension, capping, cross-linking, etc., if done in the presence of a phenolic-reactive species, such as an epoxy resin).

A duPont 1090 Thermal Analyzer was employed to determine the temperature of reaction onset by DSC (Differential Scanning Calorimetry), for each combination of latent curing agent, epoxy resin and catalyst investigated. If the benzo-N-heterocycle is simply mixed with an excess of an epoxide at a temperature at which the rate of adduction is essentially nil, and then heated in the calorimeter, two distinct exotherms will be observed for the successive reactions: (NH+oxirane) adduction and rearrangement/(phenol+oxirane) adduction, etc. However, an exotherm (peak) is seen only for the latter reaction when the material heated is a mixture of an epoxide with a preformed (NH+oxirane) adduct.

A. The curing agent/epoxide composition was a solution in DER-332 of an amount of a preformed 2-(3H)-benzoxazolone/332 adduct such that all of the total oxiranes provided could be converted by the —NH and phenolic OH groups provided by the benzoxazolone, i.e., the amount of the latter compound was 100% of the stoichiometric requirement for complete oxirane conversion. Each catalyst listed in Table 1 employed in an amount (exclusive of included HOAc) of 0.10 wt. % of the mixture.

TABLE 1

| | CATALYST COMPOSITION | | | $T_o^{(2)}$ |
|---|---|---|---|---|
| No. | Cation | Anion | HoAc[1] | °C. |
| 1 | $Et\phi_3P^+$ | $OAc^-$ | Yes | 153 |
| 2 | | $BF_4^-$ | | 192 |
| 3 | | $PF_6^-$ | | Catalyst Precipitated |
| 4 | | $SbF_6^-$ | | 182 |
| 5 | | $BF^-$ | No | 190 |
| 6 | | $PF_6^-$ | | 172 |
| 7 | | $SbF_6^-$ | | 170 |
| 8 | $n\text{-Butyl}_4P^+$ | $OAC^-$ | Yes | 165 |
| 9 | | $BF_4^-$ | | 185 |
| 10 | | $PF_6^-$ | | Catalyst Precipitated |
| 11 | | $SbF_6^-$ | | 223 |
| 12 | | $BF_4^-$ | No | 188 |
| 13 | | $PF_6^-$ | | 178 |
| 14 | | $SbF_6^-$ | | 169 |

NOTES:
[1]HOAc present with catalyst.
[2]Temperature at onset of reaction.

B. The results obtained using certain imidazole salts as catalysts are given in Table 2.

TABLE 2

| No. | CATALYST Composition | Amount | Onset Temperature °C. |
|---|---|---|---|
| 15 | Imidazole—H.HBF$_4$ | 0.10% 0.05 | 196 202 |
| 16 | 2-Methyl.HBF$_4$ Imidazole | 0.10 0.05 | 196 195 |
| 17 | 2-Ethyl.HBF$_4$ 4-Methyl Imidazole | 0.10 0.05 | 200 200 |
| 18 | 2-Ethyl.HPF$_6$ 4-Methyl Imidazole | 0.10 | 168 |
| 19 | 2-Ethyl.HSbF$_6$ 4-Methyl Imidazole | 0.10 | 209 |

C. When no catalyst was used, the reaction onset temperature was ~173° C.

Example 8

Gel times at 175° C. were determined for compositions of several different epoxies, curing agents and catalysts. 120 Minutes was considered a maximum acceptable time.

A. The 2:1 adduct of 2-(3H)-benzoxazolone with DER-332 was employed as the latent curing agent, at a level of 0.2 wt. % and at 100% of overall stoichiometric requirement, with four different epoxy resin/catalyst combinations.

TABLE 4

| Resin | Catalyst | Gel Time at 175° C. |
|---|---|---|
| DEN 438[1] | Et$_3\phi$P$^+$OAc$^-$ | 30' |
| XD-7342 | Et$_3\phi$P$^+$OAc$^-$ | 40' |
| DEN 438 | EMI[2].HSbF$_6$ | 85' |
| XD-7342 | EMI[2].HSbF$_6$ | 95' |

NOTES:
[1]Registered Trademark of The Dow Chemical Company for an epoxy novolac of the ideal formula

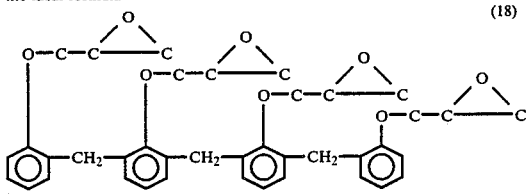

[2]2-Ethyl-4-Methyl-Imidazole.

B. 0.1 Wt. % of tetra-n-butyl phosphonium acetate was employed as the catalyst in each of the compositions listed in Table 5, following. Note that all gel times in the Table are given in seconds.

TABLE 5

| System | Gel Time At 175° C. |
|---|---|
| 1:1-Benzoxazolone/DER-332 | 175" |
| 2:1-Benzoxazolone/DER-332 + DER-332[1] | 207" |
| 2:1-Benzoxazolone/XD-7342 | 26" |
| 3:1-Benzoxazolone/XD-7342 + XD-7342[1] | 45" |

NOTE:
[1]Amount for 100% of overall stoichiometric requirement.

It was found that these systems were not stable at ambient temperature, i.e., had inadequate shelf lives. However, otherwise identical systems in which the acetate ion in the tetrabutyl phosphonium acetate was replaced by BF$_4^-$ were stable and had gel times of 80–90 minutes.

C. Imidazole catalysts in such systems also gave gel times of 80–90 minutes but were later found to result in less satisfactory cured resin properties.

D. Several so-called "complex" systems, having the compositions given below, were made up. Gel times of less than 120 minutes were attained for each of these systems without inclusion of any catalysts. The amount of epoxy resin used in each system was such that the latent phenolic functionality of the curing agent, the 3:1 adduct of 2-(3H)-benzoxazolone with XD-7342, was only 0.8 of that required to convert all the oxiranes in the resin employed. Since different resins were used in each system, the wt. %'s of the benzoxazolone and the several epoxides in each system were different, as shown in the following Table 6.

TABLE 6

| System Number | Wt. % 2-B[1] | Epoxy Resin and Wt. % (Normalized) In System | | | | Gel Time[3] Minutes |
|---|---|---|---|---|---|---|
| | | XD-7342 | DEN-438 | DER-332 | DER-736[2] | |
| 38A | 24.4 | 75 | — | 25 | — | 115 |
| 42B | 23.8 | 39 | 36 | 25 | — | 58 |
| 47A | 24.9 | 41 | 28 | 20 | 11 | 88 |

NOTES:
[1]2-(3H)—Benzoxazolone; adducted with part of total XD-7342 content shown.
[2]Registered trademark of The Dow Chemical Company for a diglycidyl ether of a linear polypropylene glycol terminated by —CH$_2$—CH$_2$OH groups; EEW ~200.
[3]Gel times of 2 hours or less are quite satisfactory for most applications.

Example 9

Effect of catalyst level on gel time at 175° C.

The gel time of a specific latent system considered representative was found to decrease as catalyst content was increased, up to a level of 0.05%; see the following Table 7. The curing agent was the 2:1 adduct of 2-(3H)-benzoxazolone with DER-332, the resin was DEN-438 and the curing agent provided 0.8 of the stoichiometric requirement of oxirane-reactive groups. The catalyst was Et$_3\phi$P$^+$BF$_4^-$.

TABLE 7

| Catalyst Level | 175° Gel Time |
|---|---|
| None | 60 minutes |
| 0.025 wt. % | 45 minutes |
| 0.050 wt. % | 30 minutes |
| 0.100 wt. % | 30 minutes |

Example 10

Effects of chloro-substitution in 2-(3H)-benzoxazolone on reaction onset time and gel time at 175° C.

The curing agent/resin system of Example 5 herein was compared with an otherwise essentially identical system in which the benzoxazolone component was unsubstituted. The system in which the curing agent was the 2:1 adduct of the 5-chloro-benzoxazolone with DER-332 was found to have an about 10° C. higher reaction onset temperature (~180° C.) and a considerably longer (93' vs 40') gel time.

EXAMPLE 11

Shelf Lives

A. A sample of a latent system consisting of the 2:1 adduct of 2-(3H)-benzoxazolone with DER-332 and more DER-332 (no excess over what was fully convertible by the curing agent) was found to have "advanced" to the extent of only 10% disappearance of available oxirane functionality after 15 months storage at room temperature (~25°–30° C.).

Accelerated tests were carried out on the same and other systems, including and not including catalysts, by determining melt viscosities at 100° C. on samples taken before and after 2 weeks storage at 50° C.

A. Curing agent; 2:1 adduct of 2-(3H)-benzoxazolone and DER-332. Resins and catalysts as given in the following Table 8. Amount of curing agent 0.8 of stoichiometric requirement for complete oxirane conversion.

TABLE 8

| Resin | Catalyst[1] | Viscosity at 100° C.; Cp. | | |
|---|---|---|---|---|
| | | Day 0 | Day 14 | Ratio |
| DER-332 | Et$_3\phi$P$^+$,BF$_4^-$ | 948 | 3,595 | 2.8 |
| | EMISbF$_6$[2] | 980 | 1,120 | 1.1 |
| DEN-438 | Et$_3\phi$P$^+$,F$_4^-$ | 5,263 | 21,000 | 4.0 |
| | EMISbF$_6$ | 5,375 | 7,000 | 1.3 |
| XD-7342 | Et$_3$O/P$^+$,BF$_4^-$ | 19,950 | 49,250 | 2.5 |
| | EMISbF$_6$ | 24,625 | 32,850 | 1.3 |

NOTES:
[1]0.1 wt. % in composition.
[2]2-Ethyl-4-methyl-Imidazole.HSbF$_6$.

B. The results of the same test when performed on two of the systems of the compositions given in Table 6, Example 8 herein (with or without catalysts) are given in the following Table 9.

TABLE 9

| System No. | Catalyst | Viscosity at 100° C.; Cp | | |
|---|---|---|---|---|
| | | Day 0 | Day 14 | Ratio |
| 38A | Et$_3\phi$P$^+$,BF$_4^-$ | 46,150 | 129,000 | 2.8 |
| 38A | EMISbF$_6$ | 46,150 | 65,000 | 1.4 |
| 47A | None | 6,100 | 18,000 | 2.9 |

Viscosity ratios of from 2 to 4 are considered to be within the range of from excellent to good.

III. CURING AGENT SOFTENING TEMPERATURES

Example 12

The Mettler dropping points of several epoxides fully capped with 2-(3H)-benzoxazolone or benzoxazinedione were determined and are given in Table 10, following.

TABLE 10

| | ADDUCT | Mettler Softening Point °C. |
|---|---|---|
| 1:1 | Benzoxazolone/DER-332; (EEW 526) | 69 |
| 2:1 | Benzoxazolone/DER-332; (EEW 526) | 90 |
| 2:1 | Benzoxazolone/RD-2[1] | 116 |
| 3:1 | Benzoxazolone/XD-7342 | 122 |
| 3.6:1 | Benzoxazolone/DEN-438 | 117 |
| 2:1 | Benzoxazinedione/DER-332 | 101 |

NOTE:
[1]Diglycidyl ether of 1,4-butanediol.

These materials are all non-sintering, flakable solid, latent phenolics but also soften at reasonably low temperatures and are therefor of interest for use in powder coatings.

IV. POT LIVES

Example 13

The pot lives of three catalyst-free, latent epoxide systems (38A, 42B and 47A; see Table 6, Example 7) were assessed by monitoring viscosity vs time and temperature. An epoxide which does not develop a viscosity greater than 2500 Cp when held at the appropriate application temperature for 2 hours is considered to have an excellent pot life. The results, including gel times, are given in Table 11 following.

TABLE 11

| | 175° C. | | |
|---|---|---|---|
| System No. | Gel Time | Time to 2500 Cp | Maximum 2 Hr. Temperature[1] |
| 38A | 115' | 88' | ~164° C. |
| 42B | 58 | 48 | ~147 |
| 47A | 88 | 76 | ~163 |

NOTE:
[1]Highest temperature at which system can be held for two hours without viscosity exceeding 2500 Cp.

V. PHYSICAL PROPERTIES OF CURED SYSTEMS

Example 14

Effect of catalyst level in Tensile Strength, Elongation and Modulus

The 2:1 adduct of 2-(3H)-benzoxazolone was mixed at 0.8 stoichiometry with DEN-438. Three portions of the mixture containing the amounts of a 1:1 mixed catalyst system (Et$_3\phi$P$^+$, OAc$^-$ and EMI.HBF$_4$) given in Table 12 were cured 18 hours at 180° C. The results are given in Table 12 following.

TABLE 12

| Catalyst Level | Tensile Strength | Elongation | Modulus |
|---|---|---|---|
| None | 11,200 psi | 7% | 212 KSI |
| 0.025 wt. % | 12,000 psi | 9% | 203 KSI |
| 0.050 | 11,100 | 7% | 200 KSI |

The differences in the tabulated values in each column are considered insignificant. Use of the catalyst had no apparent effect on the cured resin properties determined.

Example 15

Effects of differences in resin and catalyst compositions

A. A Curing agent consisting of the 2:1 adduct of 2-(3H)-benzoxazolone with DER-332 was mixed at 0.8 stoichiometry with each of two different epoxides, using several different catalysts. Each system was cured 18 hours at 180° C., then 2 hours at 200° C. Tensile Strength, Elongation, Modulus and Glass Transition Temperature (Tg) were determined for each cured system. The results are given in Table 13 following.

TABLE 13

| Resin | Catalyst[1] | Tensile Strength | Elongation | Modulus | T$_g$ |
|---|---|---|---|---|---|
| XD-7342 | Et$_3\phi$P$^+$BF$_4^-$ | 12,800 PSI | 7% | 206 KSI | 147° C. |
| " | EMI SbF$_6$ | 4,700 | 3 | — | — |
| " | Et$_3\phi$P$^+$BF$_4^-$ }[2] | | | | |
| " | EMI SbF$_6$ } | | | | |

TABLE 13-continued

| Resin | Catalyst[1] | Tensile Strength | Elongation | Modulus | $T_g$ |
|---|---|---|---|---|---|
| DEN 438 | $Et_3\phi P^+BF_4^-$ | 11,800 | 7 | — | 132 |
| " | EMI $SbF_6$ | 6,950 | 4 | — | — |

NOTES:
[1]0.1 wt. % total.
[2]1:1 ratio by weight.

B. Systems 38A, 42B and 47A (Table 6, Example 8) were cured (as test specimens) 18 hours at 180° C. and 2 hours at 200° C. The compositions of the catalysts used (0.1 wt. % level) are given together with the test results, in Table 14.

TABLE 14

| System | Catalyst[1] | Tensile Strength | Elongation | Modulus | $T_g$ |
|---|---|---|---|---|---|
| 38A | $Et_3\phi P^+BF_4^-$ | 11,400 PSI | 8% | 197 KSI | 158° C. |
| 38A | EMI $SbF_6$ | 5,700 | 4 | 217 | 166 |
| 42B | $Et_3\phi P^+,BF_4$ | 11,400 | 7 | 199 | 137 |
| 42B | None | 11,600 | 8 | 210 | 141 |
| 47A | $Et_3\phi P^+,BF_4$ | 10,900 | 6 | 218 | 123 |
| 47A | None | 7,800 | 4 | 198 | 130 |

Tensile strengths of about 11,000 or more are considered good, elongations greater than 5% are considered superior. Tg's in the range of 120°–140° are considered acceptable and Tg's in the 145°–166° range are considered superior. The lower Tg material would still be very good for some filament winding applications.

Example 16

Effect of curing agent to epoxide ratio, curing agent composition, epoxide composition and catalyst level on Tg.

Tg test specimens were prepared from each of the XD-7342/DER-332/Catalyst/Curing Agent mixtures given in Table 15, were cured 2 hours at each of four successively higher temperatures—100°, 180°, 200° and 225° C.—and were tested by DMA (Dynamic Mechanical Analysis) in a duPont 1090 Thermal Analyzer). The Tg values found are included in the Table.

TABLE 15

| Curing Agent Identity | Level[1] | Catalyst[2] Level. | 7342/332 Wt. Ratio | $T_g$ |
|---|---|---|---|---|
| 2-(3H)—Benzoxazolone | 0.7 | 0.2 wt. % | 100/0 | 205 |
| | | 0.2 | 75/25 | 175 |
| | | 0.2 | 50/50 | 165 |
| | | 0.4 | 50/50 | 160 |
| | 0.9 | 0.2 | 100/0 | 201 |
| | | 0.2 | 75/25 | 180 |
| | | 0.2 | 50/50 | 165 |
| | | 0.4 | 50/50 | 160 |
| | 1.1 | 0.2 | 100/0 | 180 |
| | | 0.2 | 75/25 | 160 |
| | | 0.2 | 50/50 | 145 |
| | | 0.4 | 50/50 | 145 |
| Benzoxazinedione[3] | 0.7 | 0.1 | 100/0 | 215 |
| | | 0.1 | 75/25 | 185 |
| | | 0.1 | 50/50 | 160 |
| | 0.9 | 0.1 | 100/0 | 205 |
| | | 0.1 | 75/25 | 175 |
| | | 0.1 | 50/50 | 155 |
| | 1.1 | 0.1 | 100/0 | 155 |
| | | 0.1 | 75/25 | 165 |
| | | 0.1 | 50/50 | 145 |

NOTES:
[1]Ratio of oxirane reactive functions to oxiranes in composition; equal to total number of YH and J groups per oxirane when curing agent is a benzoxazolone and 3/2 × total number of YH and J groups per oxirane when curing agent is benzoxazinedione.
[2]$(n\text{-butyl})_4P^+OAc^-$.
[3]Effectively a trifunctional curing agent.

Tg values above 160° C. are suitable for aerospace applications.

Example 17

Toughness of cured latent systems

Surface Work Energy ("$G_{IC}$"—a measure of toughness) was determined by the Boeing method for specimens of systems 38A, 42B and 47A cured 18 hours at 180° C.

The $G_{IC}$ values found are given (in two unit systems) in Table 16.

TABLE 16

| System No. | In. Lbs. $in^2$ | K Joules $Meter^2$ |
|---|---|---|
| 38A | 26.1 | 4.58 |
| 42B | 27.4 | 4.80 |
| 47A | 23.4 | 4.10 |

For comparison, where XD-3742 is comparably cured with MDA (methylene dianiline), $G_{IC}$ values of about 0.2–0.4 K Joules/Meter$^2$ are obtained.

Example 18

Effect of chlorine substitution in benzoxazolone on physical properties of cured systems The 2:1 adducts of 2-(3H)-benzoxazolone and 5-chloro-2-(3H)-benzoxazolone with DER-332 were used as the curing agents in two otherwise essentially identical mixtures with XD-7342. The melting points and viscosities at 100° C. of the mixture were determined and identically cured test specimens were prepared from portions of the mixtures to which had been added 0.1 wt. % of a catalyst: $Et_3\phi P^+BF_4^-$/HOAc in propylene glycol. The amount of each curing agent used was 0.8 of stoichiometric.

The test results are given in Table 17.

TABLE 17

| "Capping" Agent | 2-Benzoxazolinone | 5-Chloro-2-benzoxazolinone |
|---|---|---|
| m.p. of capping agent | 137° C. | 191° C. |
| Viscosity (100° C., cp)[1] | 11,650 | 16,550 |
| Tensile (PSI) | 12,757 | 11,748 |
| Elongation (%) | 8.0 | 8.0 |
| Tg 5° C./min | 134.0 | 145.2 |
| DSC | 127.0 | 136.7 |
| Modulus | $2.06 \times 10^5$ | $1.83 \times 10^5$ |

TABLE 17-continued

| "Capping" Agent | 2-Benzoxazolinone | 5-Chloro-2-benzoxazolinone |
|---|---|---|
| Gel Time (175° C.) | 40 min (CA)[5] | 93 min[3] |

NOTES:
[1] Viscosity of uncured mixture.
[2] Dow Stroke Cure Test.
[3] Viscometer Data.

It will be seen that except for Tg and gel times, the properties of the mixture made up with the 5-chlorobenzoxazolone were generally less desirable.

The system presently considered to have the best overall properties, i.e., the combination of good latency and superior cured resin properties is that designated herein as system 38A, which consists of about 24 wt. % of 2-(3H)-benzoxazolone (in a 3:1 adduct with part of the XD-7342, as the latent curing agent) and about 76 wt. % of XD-7342 and DER-332 (in a 75/25 overall wt. ratio) as the epoxy resin component. To summarize, the excellence of the following combination of properties will be apparent to those knowledgeable in the art.

Latency: Long shelf life, pot life 120' @164°, 135' at 155°; gel time 115' at 175°.

Cured physical properties: 11,400 psi tensile strength, 8% elongation, 200 KSI modulus, Tg 158° C. and $G_{IC}$ 4.58 KJ/M².

What is claimed is:

1. A latent mono- or polyphenol of one of the formulas

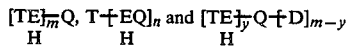

(A)  (B)  (C)

wherein:

m is an integer of 1 to 7, n is 1 or 2 and y is an integer of value less than m, Q is an organic radical, EH is derivable as follows from D, D is a group which can react with the Y—H group in a first moiety,

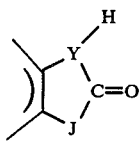

in which Y and J are as defined below, and )] is a portion of a benzene ring, to convert moiety (a) to a second moiety

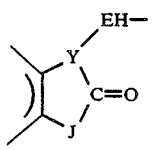

in which —E— is a group of such a nature that EH is an active hydrogen group and moiety (b) can be caused to rearrange to a third moiety

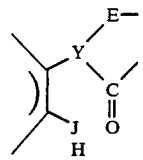

in which JH is an oxirane-reactive —OH or —SH group, and the carbonyl carbon, Y and E together provide the atoms constituting a stable ring;

and T, independently the same or different in each occurrence, is the residue of a compound of the following formula (L), containing one or two of said moieties of formula (a):

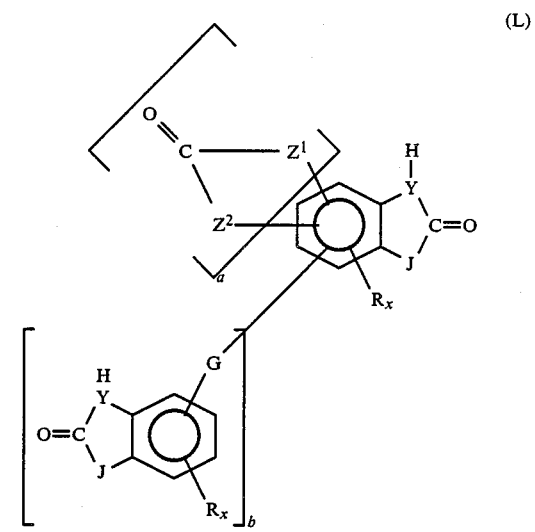

wherein one of a and b is zero and the other is zero or 1;
one of $Z^1$ and $Z^2$ is YH and the other is J and, when a=1, $Z^1$ and $Z^2$ are attached to adjacent ring carbons;

x, independently in each occurrence is zero, 1, or 2;

R is a non-interfering substituent, independently the same or different in each occurrence;

G is a valence bond, an alkylene or alkenylene group—optionally halosubstituted, CO, O, S, SO, $SO_2$, SiO;

Y is

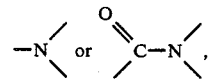

independently in each occurrence;

J is O or S, independently in each occurrence;

and the number of Y-H groups in the molecule is 1 or 2.

2. A phenol of claim 1 which is of formula (A), m being 2.

3. A phenol of claim 1 which is of formula (B), n being 2.

4. A phenol of claim 1 which is of formula (C), m-y being 1 or 2.

5. A phenol of claim 1 in which —EH— is each occurrence, is —CH₂—CR"OH or —CH₂—CO—NH— and, when said phenol is of formula (C), D correspondingly is a

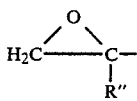

radical, in which R″ is H or CH$_3$, or an X—CH$_2$—CO—NH— radical, in which X is a halogen radical.

6. A phenol of claim 1, wherein, in T, Y is <N— in each occurrence.

7. A phenol of claim 1, wherein, in T, Y is —CO—N> in each occurrence.

8. A phenol of claim 1, wherein, in T, J is oxygen in each occurrence.

9. A phenol of claim 1, wherein, in T, x is zero or 1, independently in each occurrence, and R is cyano, halo, nitro, C$_1$–C$_5$ alkoxy, phenoxy, C$_1$–C$_5$ alkyl or alkenyl, C$_6$–C$_{10}$ aryl, aralkyl or alkylphenyl and C$_1$–C$_5$ alkylthio, independently in each occurrence.

10. A phenol of claim 1, wherein, in T, x is zero in each occurrence.

11. A phenol of claim 1 in which T, in at least one occurrence, is the residue of a compound of formula (L$_1$), (L$_2$), (L$_3$) or (L$_4$) following:

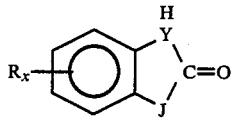 (L$_1$)

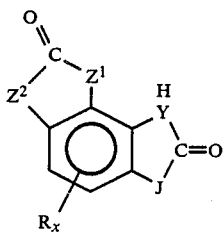 (L$_2$)

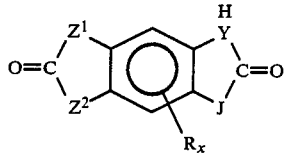 (L$_3$)

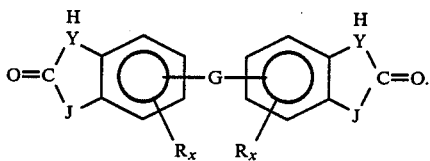 (L$_4$)

12. A phenol of claim 11 in which T, in all occurrences, is the residue of the same compound of the formula (L$_1$), (L$_2$), (L$_3$) or (L$_4$).

13. A phenol of claim 1 derivable from an epoxide of the formula

Q—(—D—)$_m$ wherein D is a

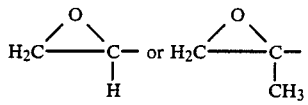

group and Q is an organic radical comprising from 1 to 7 benzene rings, each of said D groups being attached by a valence bond, a —CH$_2$— group or a —CH$_2$—O— group, independently, to the same one or different ones of the latter rings.

14. A phenol of claim 13 in which said epoxide may be represented by the formula

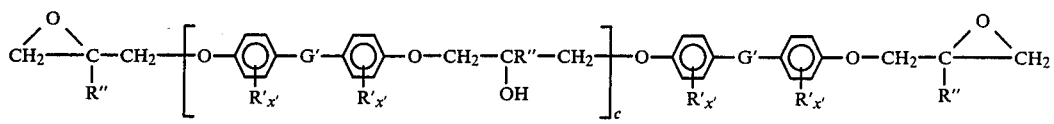

wherein c has a value of 0 to about 90, R″ is H or CH$_3$, independently, and x′, R′ and G′ are defined as are x, R and G, respectively, in formula (L).

15. A phenol of claim 13 in which said epoxide may be represented by the formula

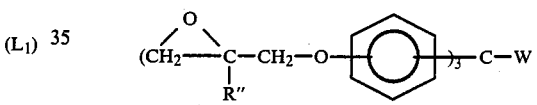

W being H or C$_1$–C$_{10}$ alkylene or alkenylene and R″ being H or CH$_3$, independently.

16. A phenol of claim 13 in which said epoxide may be represented by the formula

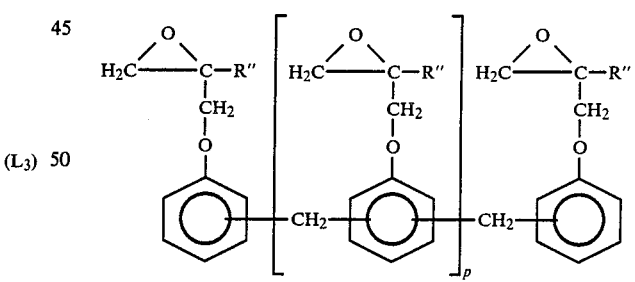

wherein p has a value of from 1 to about 5 and R″ is H or CH$_3$, independently.

17. A phenol of claim 13 in which —EH—, in each occurrence, is —CH$_2$—CH—OH and, when said phenol is of formula (C), D correspondingly is a

radical.

18. A phenol of claim 17 in which T, in all occurrences, is the residue of a compound of the formula

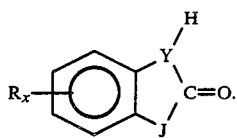 (L₁)

19. A phenol of claim 18 in which the latter compound is 2-(3H)-benzoxazolone.

20. A phenol of claim 18 in which the latter compound is benzoxazinedione.

21. A phenol of claim 19 derived from the diglycidyl ether of a bisphenol as said epoxide.

22. A phenol of claim 19 derived from a tri(-glycidyloxyphenyl)methane as said epoxide.

23. A phenol of claim 19 derived from an epoxy novolac as said epoxide.

24. A phenol of claim 20 derived from the diglycidyl ether of a bisphenol as said epoxide.

25. A phenol of claim 20 derived from a tri(-glycidyloxyphenyl)methane as said epoxide.

26. A phenol of claim 20 derived from an epoxy novolac as said epoxide.

27. A phenol of any of claims 1–26 inclusive, in admixture with one or more epoxides.

* * * * *

UNITED STATES PATENT AND TRADEMARK OFFICE
CERTIFICATE OF CORRECTION

PATENT NO. : 4,716,204

DATED : December 29, 1987

INVENTOR(S) : Theodore L. Parker

It is certified that error appears in the above-identified patent and that said Letters Patent is hereby corrected as shown below:

ON THE TITLE PAGE:
In References Cited, delete "4,380,781" and insert
-- 4,350,781 --;

Col. 5, line 3, delete "13" and insert -- - --;

Col. 7, line 17, after "EH=-CH$_2$-CHOH," insert -- Q= --;

Col. 9, line 68, delete "<CH-" and insert -- >CH- --;

Col. 10, lines 17-27, formula should read as follows:

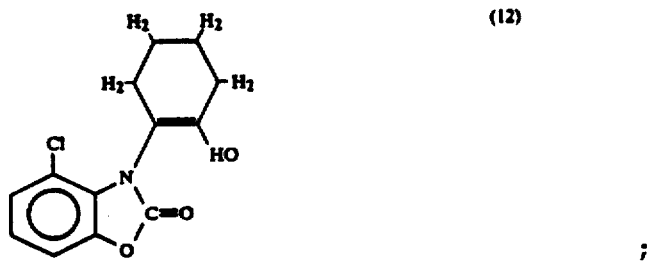

;

Col. 12, line 22, delete "2amino-3,5-dichlorophenol" and insert -- 2-amino-3,5-dichlorophenol --;

Col. 12, line 66, "oxirane" has been misspelled;

Col. 15, line 31, "oxiranes" has been misspelled;

Col. 17, line 34, after "converts" delete ")";

UNITED STATES PATENT AND TRADEMARK OFFICE
CERTIFICATE OF CORRECTION

PATENT NO. : 4,716,204
DATED : December 29, 1987
INVENTOR(S) : Theodore L. Parker It is certified that error appears in the above-identified patent and that said Letters Patent is hereby corrected as shown below:

Col. 18, line 68, delete "has" and insert -- had --;

Col. 20, line 3, delete "and" and insert -- had --;

Col. 20, line 42, after "Table 1" insert -- was --;

Col. 24, line 30, delete "in" and insert -- on --;

Col. 26, lines 51 and 52, "identical" has been misspelled;

Col. 28, line 44, after "occurrence" insert -- , --;

Col. 28, line 67, delete "is" and insert -- in --;

Col. 29, line 11, delete "<N-" and insert -- >N- --;

Col. 29, line 14, delete "-CO-N>" and insert -- -CO-N< --.

Signed and Sealed this

Thirty-first Day of January, 1989

*Attest:*

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,716,204

DATED : December 29, 1987

INVENTOR(S) : Theodore L. Parker

It is certified that error appears in the above-identified patent and that said Letters Patent is hereby corrected as shown below:

Col. 6, lines 54-55, formula should read as follows:

$$[TE\frac{1}{H}Q+D]_{n-}, \quad (3)c$$

Signed and Sealed this

Sixteenth Day of May, 1989

Attest:

DONALD J. QUIGG

Attesting Officer

Commissioner of Patents and Trademarks